E. D. HALL.
CHEESE COVER.
APPLICATION FILED AUG. 18, 1909.
957,053.
Patented May 3, 1910.
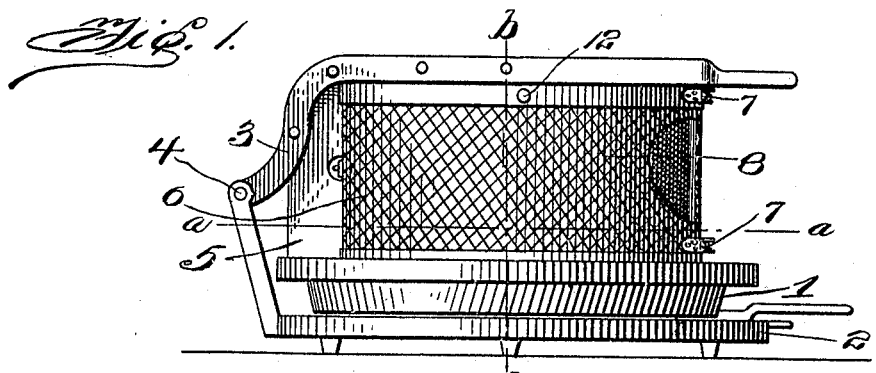
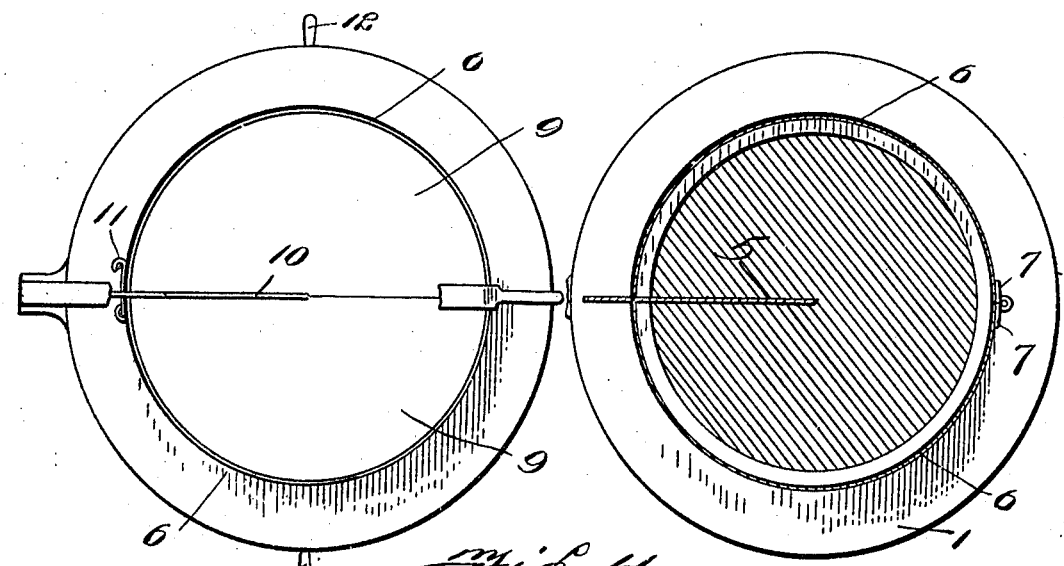
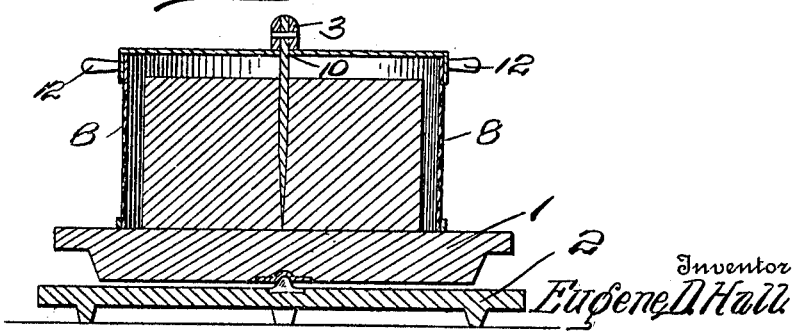
Witnesses
G. F. Folson
J. W. Garner
Inventor
Eugene D. Hall
By Victor J. Evans
Attorney

UNITED STATES PATENT OFFICE.

EUGENE D. HALL, OF IUKA, MISSISSIPPI.

CHEESE-COVER.

957,053.     Specification of Letters Patent.     Patented May 3, 1910.

Application filed August 18, 1909. Serial No. 513,499.

*To all whom it may concern:*

Be it known that I, EUGENE D. HALL, a citizen of the United States, residing at Iuka, in the county of Tishomingo and State of Mississippi, have invented new and useful Improvements in Cheese-Covers, of which the following is a specification.

This invention is an improved cheese cover or screen for use in connection with a cheese cutter for screening the cheese from flies and other insects, the said invention consisting in the construction, combination and arrangement of devices hereinafter described and claimed.

In the accompanying drawing:—Figure 1 is an elevation of a cheese cutting machine provided with a screen or cover constructed in accordance with my invention. Fig. 2 is a plan of the same, a portion of the lever handle of the cutter knife being removed. Fig. 3 is a sectional view of the same on the plane indicated by the line $a$—$a$ of Fig. 1. Fig. 4 is a similar view on the plane indicated by the line $b$—$b$ of Fig. 1.

The cheese cutter on which my improved screen or cover is adapted for use is of well known construction comprising a revoluble cheese carrying table 1, a base 2 on which the table is mounted, a lever handle 3 pivotally connected to an arm of the base as at 4 and a cutter knife 5 secured to said lever handle near its inner end and movable thereby in a vertical plane to and from the table for cutting cheese in segmental slices as will be understood.

My improved screen or cover comprises a cylindrical frame of suitable size to fit on the table 1 and formed of a pair of semi-cylindrical members 6 which are connected together on one side by spring hinges 7. The said frame members are covered by wire gauze or other suitable foraminous fabric 8. The top of the cover or screen is preferably made of wood or may be made of any other suitable material and comprises a pair of semi-circular sections 9 which are adapted to open or to close together and which are recessed in opposite sides as at 10 to receive the cutter knife 5 and to close against the same so as to secure the cover or screen to the cutter knife and cause it to move therewith when the cutter knife is operated. It will be understood that the tension of the spring hinges 7 keeps the members of the screen or cover clamped firmly against opposite sides of the cutter knife so that the cover or screen does not become casually detached therefrom when in use. A hook or other suitable device 11 may also be employed at the free sides of the screen members to lock the same together and on opposite sides of the cutter knife. To facilitate the opening of the members of the screen or cover and the removal of the same from the cheese cutter, the said members are provided near the upper side with oppositely extending handles 12.

My improved cheese screen or cover is extremely cheap and simple, is very durable, may be readily attached to the cutter knife of a cheese cutting machine and used in connection therewith and requires little or no attention.

What is claimed is:—

1. The herein described cheese screen or cover comprising a pair of sections or members connected together for movement toward and from each other and means to secure the same on the cutter knife of the cheese cutter.

2. The herein described cheese cover or screen comprising a pair of members connected together on one side and springs to close said members and clamp them on opposite sides of the knife of the cheese cutter.

In testimony whereof I affix my signature in presence of two witnesses.

EUGENE D. HALL.

Witnesses:
W. P. BOLDING,
T. L. BROWN.